United States Patent
Klems et al.

(10) Patent No.: US 8,261,026 B2
(45) Date of Patent: Sep. 4, 2012

(54) APPLICATION CACHE POPULATION FROM PEER APPLICATION

(75) Inventors: Ryan R. Klems, Oro Valley, AZ (US); David Koski, San Jose, CA (US)

(73) Assignee: Apple Inc., Cupertino, CA (US)

( * ) Notice: Subject to any disclaimer, the term of this patent is extended or adjusted under 35 U.S.C. 154(b) by 824 days.

(21) Appl. No.: 12/044,852

(22) Filed: Mar. 7, 2008

(65) Prior Publication Data
US 2009/0228647 A1   Sep. 10, 2009

(51) Int. Cl.
*G06F 13/00* (2006.01)
(52) U.S. Cl. ......... 711/148; 711/173; 709/215; 709/216
(58) Field of Classification Search ................. 711/124; 707/636, 737, 748; 709/212–222, 230–232
See application file for complete search history.

(56) References Cited

U.S. PATENT DOCUMENTS

| | | | | |
|---|---|---|---|---|
| 5,845,104 | A * | 12/1998 | Rao | 711/113 |
| 6,185,617 | B1 * | 2/2001 | Housel et al. | 709/227 |
| 6,697,849 | B1 * | 2/2004 | Carlson | 709/219 |
| 2004/0117648 | A1 * | 6/2004 | Kissel | 713/200 |
| 2005/0120133 | A1 * | 6/2005 | Slack-Smith | 709/234 |
| 2008/0163303 | A1 * | 7/2008 | Chou et al. | 725/46 |
| 2009/0182836 | A1 * | 7/2009 | Aviles et al. | 709/213 |

* cited by examiner

*Primary Examiner* — Brian Peugh
*Assistant Examiner* — Nicholas Simonetti (57) ABSTRACT

Improved approaches to manage cache data for applications operating in a data center environment are disclosed. Data requests incoming over a network are able to be responded to by an application in a consistent and rapid manner through intelligent management of cache data. When like applications are being concurrently operated, such as at a data center, cache data established by one application can be made available for use by another like application. As a result, cache data available to a given application is more likely to be useful to the application, particularly when the application has just been started (or restarted).

17 Claims, 5 Drawing Sheets

APPLICATION CACHE POPULATION FROM PEER APPLICATION

BACKGROUND OF THE INVENTION

Today, data centers (e.g., Internet data centers) are often used to store content associated with websites. Data centers are geographically distributed so as to provide regional storage for data content being made available from a website. By geographically distributing website content to the various data centers, server load for a particular website is geographically distributed, thereby reducing response time and avoiding network congestion. For example, when a user requests data (such as a webpage) from a website via a network (such as the Internet), the geographically proximate data center can be accessed to retrieve the requested data (webpage). As a result, the use of data centers allows the requested data to be returned to the requester faster and more reliably.

At such data centers, numerous applications are typically running on numerous computing devices (namely, servers) resident at the data centers. Since a data center normally hosts data for a large number of websites, each data center concurrently operates a set of like applications to handle the high volume of incoming requests to the various websites. Hence, within a given data center, the load on a particular type of application can be distributed across the set of like applications that are concurrently operating. The use of the concurrent applications also provides redundancy in case of failures. Nevertheless, it is not uncommon for an application or a computing device operating one or more applications to fail, shutdown or lockup. In such case, the application (and possibly also the computing device) needs to be restarted (or re-launched) in order to resume operation. For performance reasons, it is common for these applications at the data center to each utilize a cache to store likely utilized data. Advantageously, a cache can significantly improve an application's response time.

Unfortunately, however, when an application is restarted, its cache is initially empty. When the cache is empty, the application's response time in responding to requests is dramatically longer (i.e., slower) than when the cache is fully populated. Hence, when an incoming request is being served by a newly restarted application, the requester must endure significant undesired delay (e.g., latency) before a response having the requested data is supplied to the requester. Consequently, there is a need for improved approaches to better manage response latency with restarted applications.

SUMMARY OF THE INVENTION

The invention relates to management of cache data for applications operating in a data center environment. Data requests incoming over a network are able to be responded to by an application in a consistent and rapid manner through intelligent management of cache data. When like applications are being concurrently operated, such as at a data center, cache data established by one application can be made available for use by another like application. As a result, cache data available to a given application is more likely to be useful to the application, particularly when the application has just been started (or restarted).

The invention can be implemented in numerous ways, including as a method, system, device, or apparatus (including computer readable medium). Several embodiments of the invention are discussed below.

As a method for operating an application on a computing device while utilizing cache storage for storing cached data, one embodiment of the invention can, for example, include at least: initiating startup of the application; locating a set of running applications that are peers with the application being started, with each of the running applications having associated cached data; selecting one of the running applications from the set of running applications; retrieving cached data associated with the selected running application; and storing the retrieved cached data in cache storage for the application being started.

As a method for starting up an application operating on a computing device and utilizing cache storage for storing cached data, one embodiment of the invention can, for example, include at least: initiating startup of the application; locating a set of running applications that are peers with the application being started, with each of the running applications having associated cached data; obtaining a set of scores pertaining to cached data associated with each of the running applications within the set of running applications; selecting one of the scores; requesting cached data from the running application corresponding to the selected score; receiving cached data from the running application corresponding to the selected score; and storing the received cached data in cache storage for the application being started.

As a computer readable medium including at least executable computer program code tangibly stored thereon for improving response latency of an application operating on a computing device, one embodiment of the invention can, for example, include at least: computer program code for identifying an application having an associated cache storage to be updated; computer program code for locating a set of running applications that are peers with the identified application, with each of the running applications having cached data stored in an associated cache storage; computer program code for selecting one of the running applications from the set of running applications; computer program code for retrieving cached data associated with the selected running application; and computer program code for storing the retrieved cached data in the associated cache storage to the identified application.

Other aspects and embodiments of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention relates to management of cache data for applications operating in a data center environment. Data requests incoming over a network are able to be responded to by an application in a consistent and rapid manner through intelligent management of cache data. When like applications are being concurrently operated, such as at a data center, cache data established by one application can be made available for use by another like application. As a result, cache data available to a given application is more likely to be useful to the application, particularly when the application has just been started (or restarted).

Embodiments of various aspects of the invention are discussed below with reference to FIGS. 1-5. However, those skilled in the art will readily appreciate that the detailed description given herein with respect to these figures is for explanatory purposes as the invention extends beyond these limited embodiments.

Figure 1:
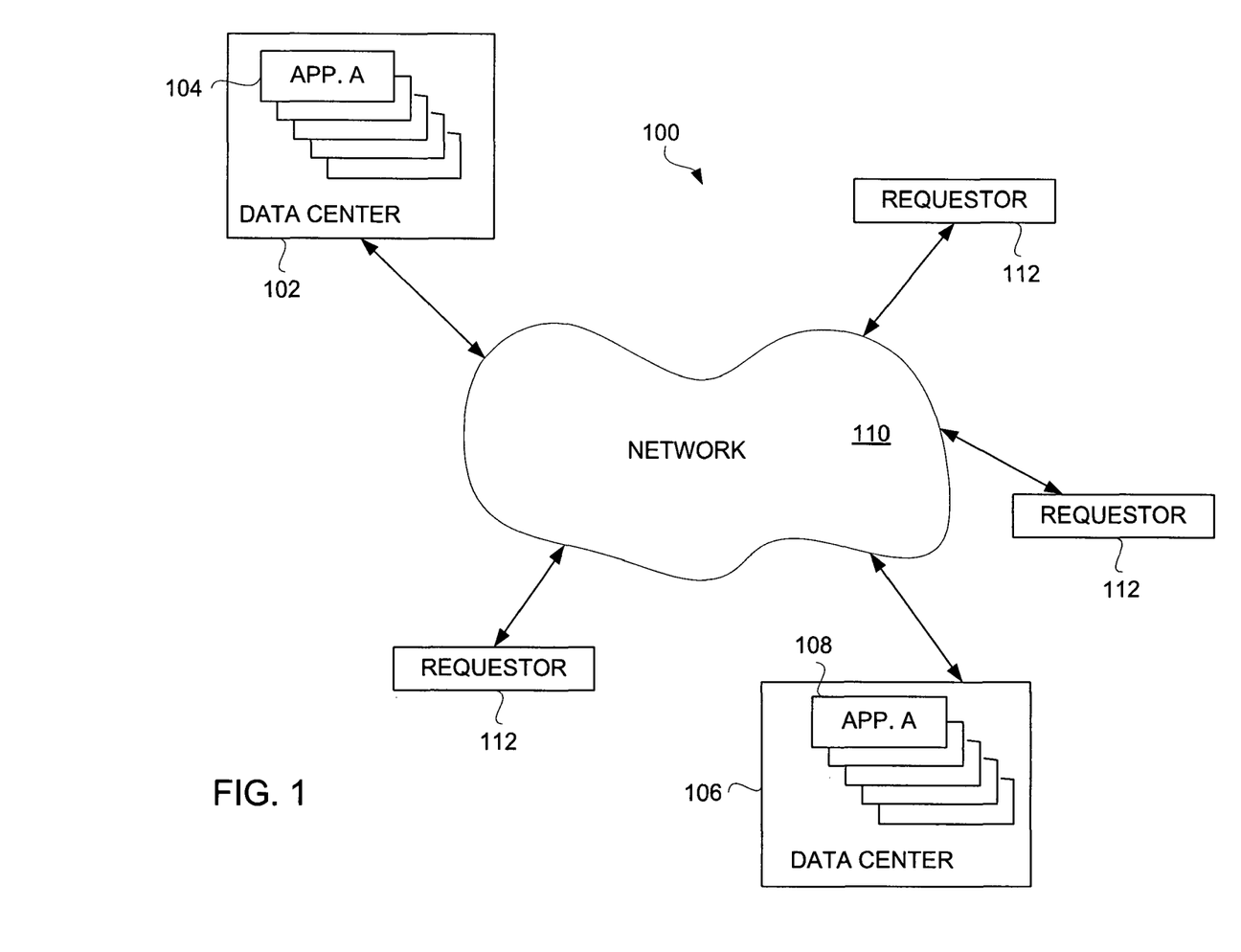
FIG. 1 is a block diagram of a network-based data system according to one embodiment of the invention.

FIG. 1 is a block diagram of a network-based data system 100 according to one embodiment of the invention. The network-based data system 100 includes a first data center 102 that operates a plurality of first applications 104. These first applications 104 pertain to application A, such that each of the first applications operating at the first data center 102 are the same (or nearly the same) application program. The first applications 104 can operate concurrently and can respond to a high volume of data requests with responsive data provided by the data center 102.

The network-based data system 100 also includes a second data center 106. The second data center 106 operates a plurality of first applications 108. These first applications 108 can be the same as or similar to the first applications 104, which pertain to application A. The first applications 108 can operate concurrently and can respond to a high volume of data requests with responsive data provided by the data center 106.

The network-based data system 100 includes or utilizes a data network 110. The data network 110 can represent one or more networks, which can be wired or wireless. For example, the data network can represent the Internet. The first data center 102 and the second data center 106 can connect to the data network 110. The network-based data system 100 also supports a plurality of requesters 112. The requesters 112 can couple to the data network 110 to interact with the first data center 102 or the second data center 106. More particularly, a requester 112 can send a request for data to the first data center 102 or the second data center 106. The request for data by the requestor 112 data can be sent to the application 104 in the data center 102 or the application 108 in the data center 106. One of the applications that are running at the utilized data center is assigned the task of handling the incoming request for data. The assigned application typically retrieves the data being requested and returns the requested data to the requester 112.

The applications operating in the respective data centers can utilize a cache to store cache data. In one embodiment, each application maintains and utilizes its own cache. The cache can assist the associated application with rapidly responding to data requests. To the extent that the cache stores the data being requested, the application is able to rapidly retrieve the requested data directly from the cache and return it to the requester 112. Hence, the response time for an application is satisfy a data request can be substantially shortened when the cached data is within the cache of the application.

Accordingly, according to one aspect of the invention, each of the applications 104, 108 within the respective data centers 102 and 106 can maintain a cache for storage of cache data. However, in the event that one of the applications is being started, its cache is initially empty upon startup. In one embodiment of the invention, the cache for the application being started up can be initially filled with cache data provided by a peer application. Such initially filling of a cache can be referred to as dynamic "pre-warming" of the cache. In other words, a peer application that is accessible to the application being started can supply its cache data to the application being started such that the cache for the application being started can be initially populated (or filled) using the cache data from the peer application. Consequently, when an application is being started up, its cache data can be initially populated with useful cache content such that the application is able to operate in an efficient manner following startup. As a result, applications, such as server applications, can provide greater and/or more consistent quality of service and to avoid slow response times for newly re-started applications.

As used herein, an application refers to a software application or process that operate when executed by a computing device, such as a server computer. In one embodiment, the application operates within a network-based data system. For example, the application can operate on a server computer (or network server) associated with a data center.

Figure 2:
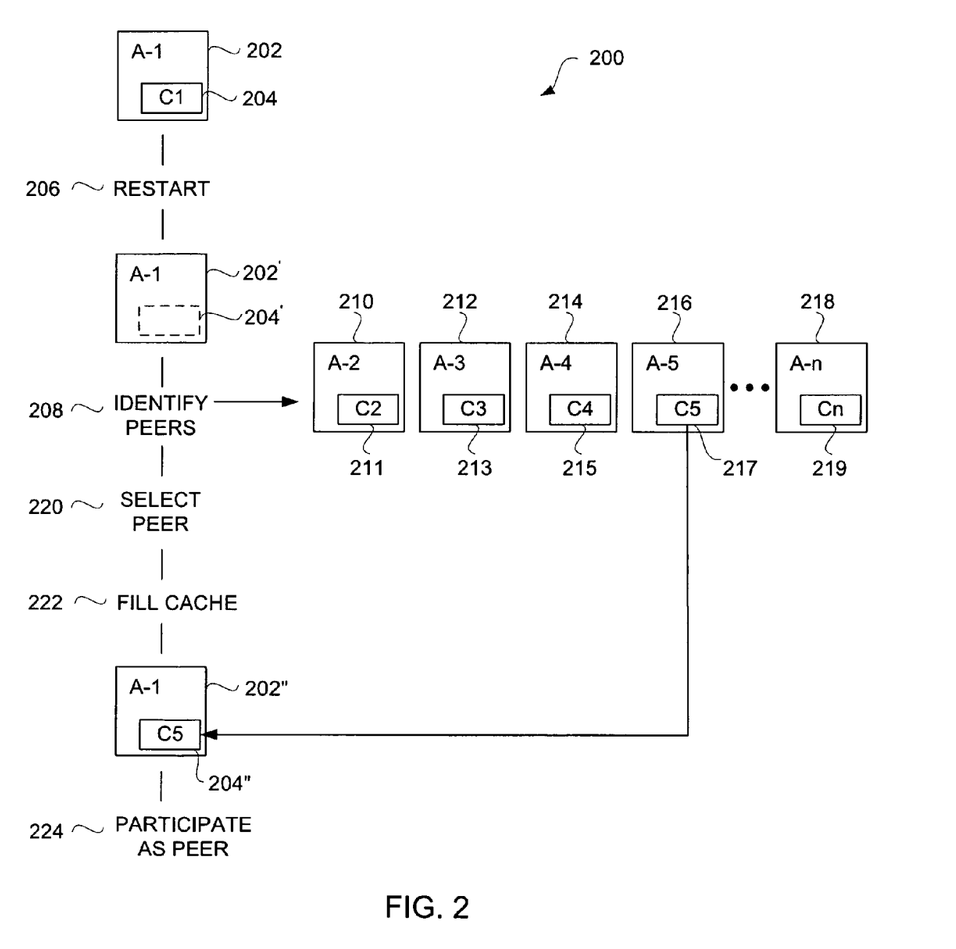
FIG. 2 is a diagram of a cache filling system according to one embodiment of the invention.

FIG. 2 is a diagram of a cache filling system 200 according to one embodiment of the invention. The cache filling system 210, for example, can be used to fill a cache associated with an application being re-started. For example, an application being re-started can correspond to one of the applications 104 or 108 discussed above in FIG. 1.

In FIG. 2, a representative scenario for startup of an application is presented. Initially, an application A-1 202 is assumed to be operating and utilizing a cache C1 204. However, at some point in time, it is assumed that the application A-1 202 fails or is shutdown and therefore subsequently needs to be restarted. The restart can pertain to restart of the application A-1 202 alone or can pertain to restart of the application A-1 20 along with a computing device operating the application A-1 202. Hence, following a restart step 206, the application A-1 202' is started but initially has no cache data stored in the cache C1 204'. However, at step 208, peer applications to the application A-1 202' can be identified.

A peer to an application is a like (e.g., same or similar) application. For example, if the application is a web service application, then a peer to the application is also a web service application. A data center often operates a plurality of like applications for redundancy and load-balancing reasons. Hence, in one embodiment, the like applications are identical or nearly identical applications operating as a group to provide high-speed and reliable data-driven services. In one embodiment, to determine available peer applications a particular application looking for peers can broadcast a message to applications at a data center. For example, these applications can be coupled to a network backplane that interconnects these various applications. In another embodiment, to determine available peer applications a particular application looking for peers can send a message to a notification service provided at a data center. The notification service can centrally maintain status of applications that are available at the data center. For example, when an application begins operation, the application can notify the notification service of its availability, and when the application ceases operation, the application can notify the notification service of its unavailability. An application looking for peers can thus ask the notification service for available peers.

As illustrated in FIG. 2, the representative scenario has n peer applications. These peer applications, include application A-2 210, application A-3 212, application A-4 214, application A-5 216 through application A-n 218. Each of these peer applications 210 through 218 are assumed to be in operation. Hence, each of these applications 210 through 218 utilize a cache to store respective cache data. In particular, application A-2 210 stores cache data in cache C2 211, application A-3 212 stores cache data in cache C3 213, application A-4 214 stores cache data in cache C4 215, application A-5 216 stores cache data in cache C5 217, and application A-n 218 stores cache data in cache Cn 218.

Following step 208, a peer application can be selected at step 220. Here, the selected peer application is one of the peer applications that has been identified in step 208. The selection of the one of the peer applications can be based on one or more factors, such as cache quality or quantity. Once a peer application has been selected, the cache 204' of the application A-1 202' being restarted can be filled at step 222. Specifically, when the selected peer application is the application A-5 216, the cache data from the cache C5 217 of the application A-5 216 can be supplied to the application A-1 202" and stored in the cache C1 204". Hence, the cache C1 204" of the application A-1 202" being restarted can be initially populated with cache data provided by the selected peer application. In this example, cache data from the cache C5 217 associated with the application A-5 216 is used to initially populate (e.g., "pre-warm") the cache C1 204" of the application A-1 202". Thereafter, the application A-1 202" is now able to operate with the presence of useful cache data immediately following being restarted. At this point, at step 224, the application A-1 202 can participate as a peer application for other applications.

Figure 3:
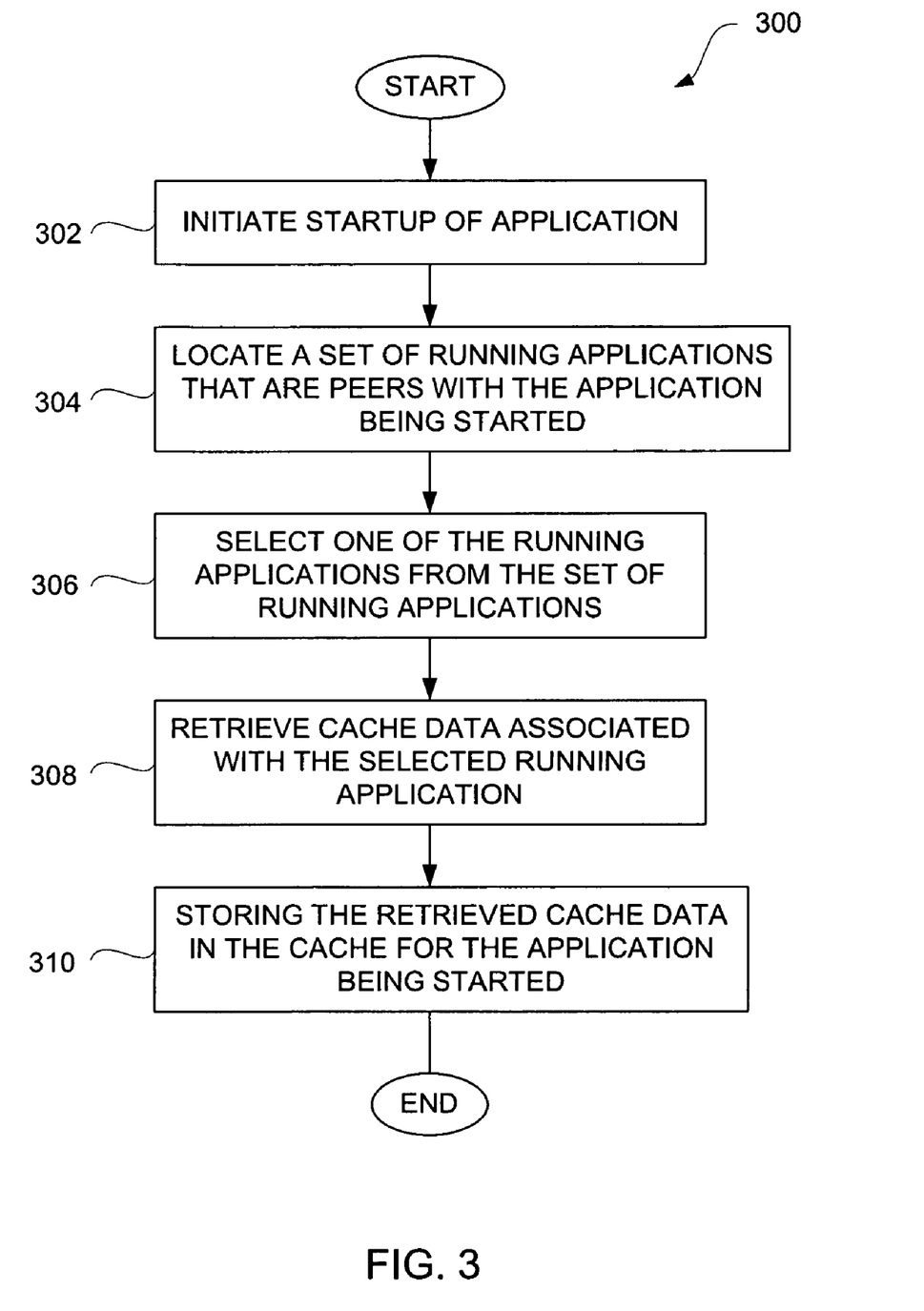
FIG. 3 is a flow diagram of an application startup process according to one embodiment of the invention.

FIG. 3 is a flow diagram of an application startup process 300 according to one embodiment of the invention. The application startup process 300 is, for example, performed by or on behalf of an application operating on a computing device. The application startup process 300 is, for example, performed by one or more of the applications A 104, 108 illustrated in FIG. 1.

The application startup process 300 can be performed when an application is to be started (or restarted). In other words, the application startup process 300 can be invoked when an application is to be started. The application startup process 300 initially initiates 302 startup of the application. For example, the application can be launched or invoked on the computing device performing the application startup process 300.

Next, a set of running applications that are peers with the application being started can be located 304. Here, it is assumed that the application being started operates in an environment that operates a plurality of like applications (e.g., peer applications), such as in a data center responsible for providing high-speed access to data over a network (such as the Internet). The application being started includes or has access to a cache that is used to reduce latency for data responses provided by the application. The cache provides local, high-speed data storage. Likewise, each of the running applications that are peers with the application being started include a cache. While the data in each of the caches (for the peer applications as well as the application being started) are not identical, the data in the different caches tend to be similar, at least after the applications have been running for some time.

Thereafter, one of the running applications is selected 306 from the set of running applications that are peers with the application being started. The selection 306 of a particular one of the running applications from the set of running applications can be performed based on various different criteria. However, in one embodiment, the selection 306 of the particular one of the running applications can be performed based on the characteristics of the caches associated with the set of running applications. In one particular implementation, the number of entries within the cache can be used to make the selection 306. In such case, the application having a cache with a greater number of entries can be more likely selected 306 as the particular application. In other implementations, other characteristics of the cache can be utilized, such as age, hit ratio, etc.

After the particular one of the running applications has been selected 306 from the set of running applications, cache data associated with the selected running application can be retrieved 308. The cache data that has been retrieved 308 can then be stored 310 in the cache for the application being started. Following the block 310, the application startup process 300 can end given that the application has been started up and its cache has been initially populated using cache data from a peer application.

Figure 4:
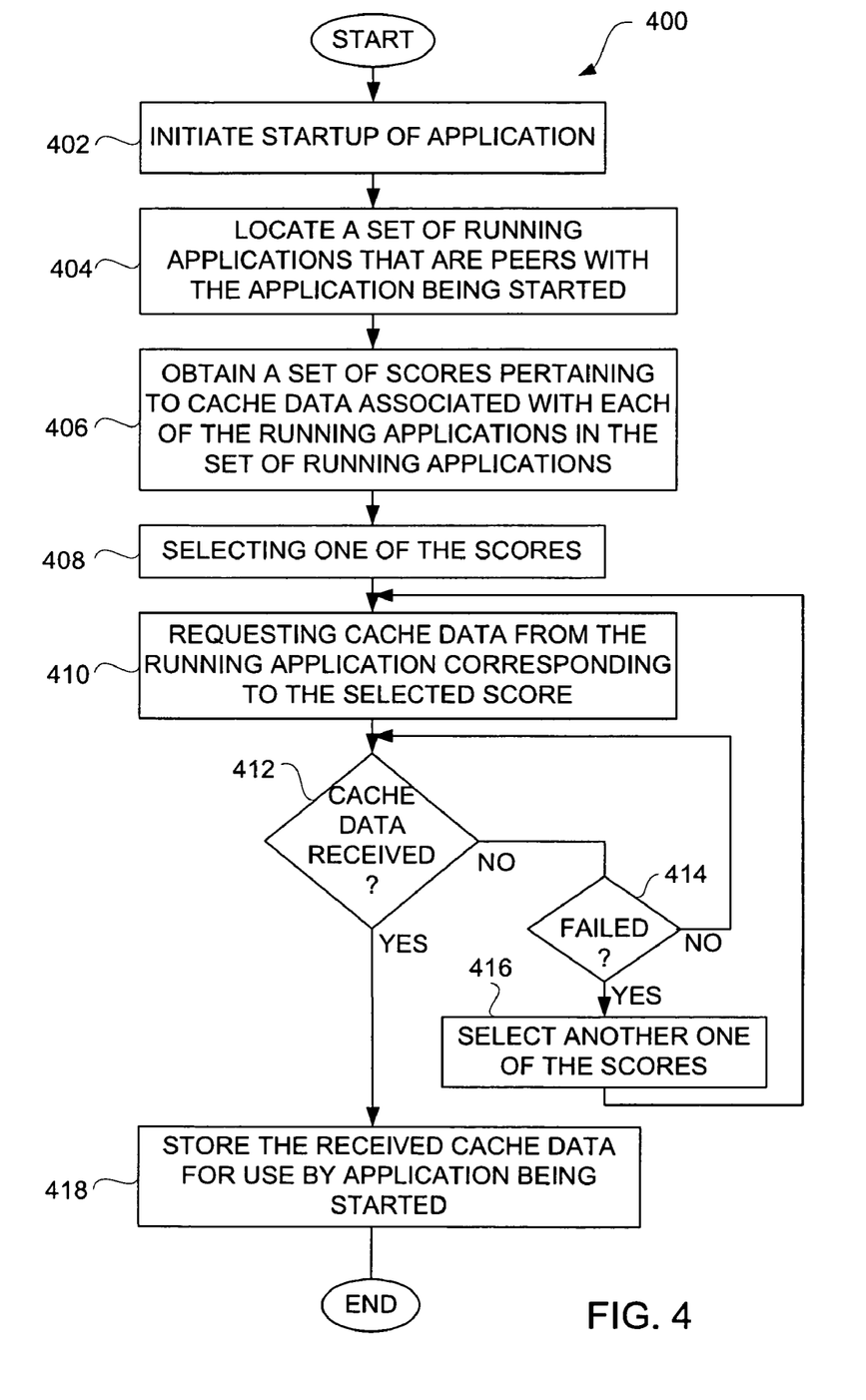
FIG. 4 is a flow diagram of an application startup process according to another embodiment of the invention.

FIG. 4 is a flow diagram of an application startup process 400 according to another embodiment of the invention. The application startup process 400 is, for example, performed by or on behalf of an application operating on a computing device. The application startup process 400 is, for example, performed by one or more of the applications A 104, 108 illustrated in FIG. 1.

The application startup process 400 can be performed when an application is to be started (or restarted). In other words, the application startup process 400 can be invoked when an application is to be started. The application startup process 400 initially initiates 402 startup of the application. For example, the application can be launched or invoked on the computing device performing the application startup process 400.

Next, a set of running applications that are peers with the application being started can be located 404. Here, it is assumed that the application being started operates in an environment that operates a plurality of like applications (e.g., peer applications), such as in a data center responsible for providing high-speed access to data over a network (such as the Internet). The application being started includes or has access to a cache that is used to reduce latency for data responses provided by the application. The cache provides local, high-speed data storage. Likewise, each of the running applications that are peers with the application being started include a cache. While the data in each of the caches (for the peer applications as well as the application being started) are not identical, the data in the different caches tend to be similar, at least after the applications have been running for some time. In one embodiment, the peer application are limited to those like applications that have a similar configuration or context (e.g., environment, language, locality, etc.).

After the set of running applications that are peers have been located 404, a set of scores pertaining to cached data can be obtained 406. These scores can provide separate ratings for the cached data associated with each of the running applications. For example, those running applications that have higher scores indicate that the cached data for such running applications is likely more useful. After the set of scores pertaining to cached data is obtained, one of the scores can be selected 408. Typically, the score being selected would be the highest of these scores in the set of scores. For load balancing reasons, the scores can include a randomized component. For example, with the randomized component being up to about 10% of the upper scores, the net scores of the upper scores will vary such that the cache data having the highest score is not repeatedly associated with the same application.

After the one of the scores has been selected 408, cached data can be requested 410 from the running application corresponding to the selected score. Next, a decision 412 can determine whether the cached data that has been requested has been received. When the decision 412 determines that the cached data has not been received, a decision 414 can determine whether the request for the cached data has failed. If the decision 414 determines that the request for the cached data has not failed, the application startup process 400 can return to repeat the decision 412. If, for some reason, the request for cached data has failed, another one of these scores can be selected 416 (e.g., next highest score). Thereafter, the application startup process 400 can return to repeat the block 410 so that cached data can be requested 410 from the running application corresponding to the newly selected score. On the other hand, when the decision 412 determines that the cached data has been received, the received cached data can be stored 418 for use by the application being started. Following the block 418, the application startup process 410 can end. At the completion of the application startup process 400, the application has been started up and its cache has been initially populated using cached data from a peer application.

In one embodiment, the caches discussed above with reference to FIGS. 3 and 4 can be assumed to include or represent a plurality of individual caches. While the individual caches can be processed as a group as in FIGS. 3 and 4, the individual caches can also be processed separately as in FIG. 5.

In other embodiment, the scores being obtained 406 can take into consideration other factors. In one example, the scoring can be influenced by application location (proximity). As an example, a running application in a different data center could be assigned a lower score because access to such cache data in another data center requires data transfer over a network connection that is slower than the network bandwidth internal to the data center. In another example, other loading adjustments (besides the above noted randomized component) can performed to perform load balancing. As an example, a particular running application whose associated cache data was previously selected and used by a peer can have its score temporarily degraded so as to be less like re-selected for a period of time. In still another example, of the individual caches are processed, the score can be provided for the individualized caches.

Figure 5:
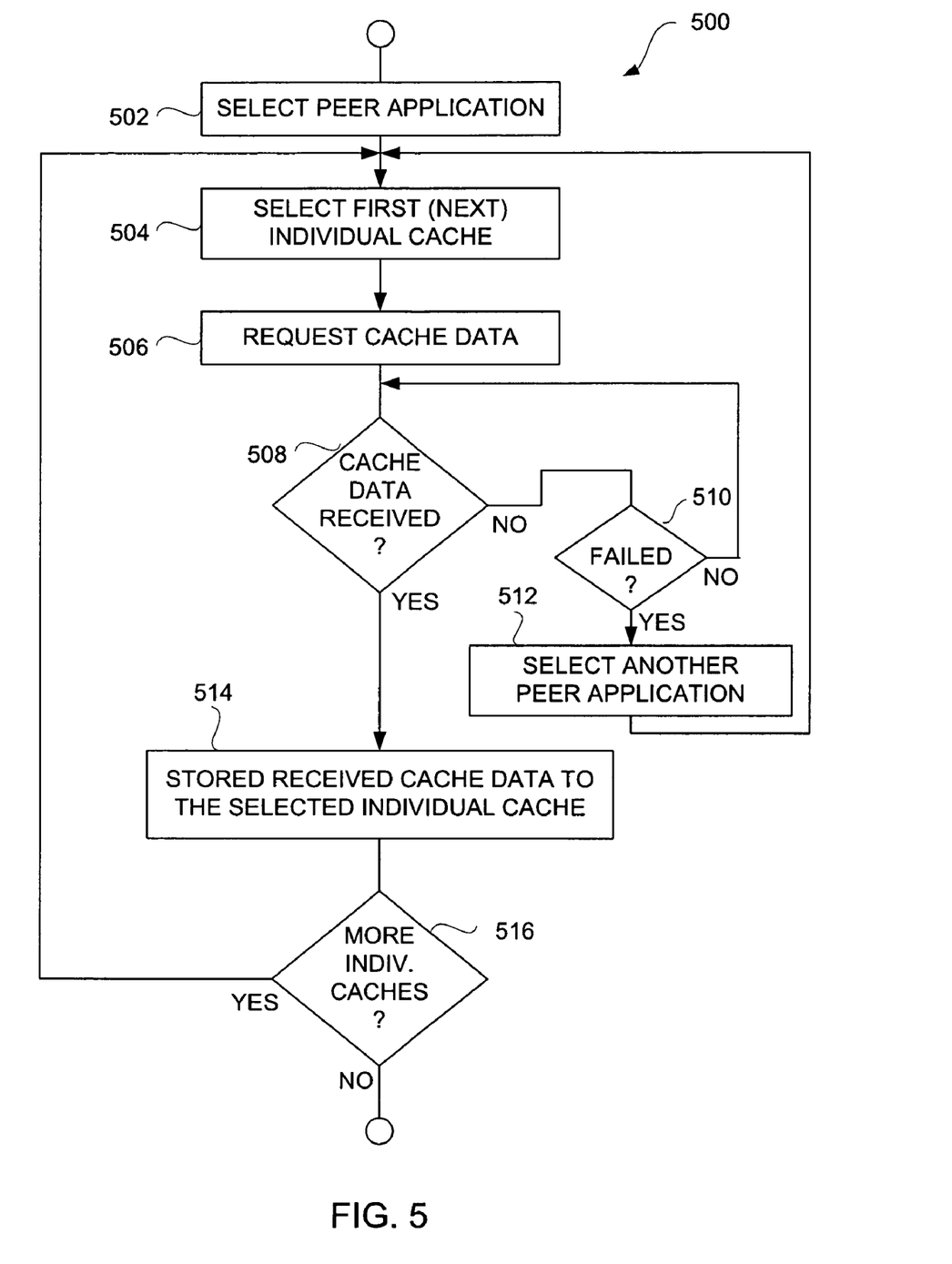
FIG. 5 is a flow diagram of a cache pre-load process according to one embodiment of the invention.

FIG. 5 is a flow diagram of a cache pre-load process 500 according to one embodiment of the invention. The cache pre-load process 500 is, for example, processing that can be performed to implement blocks 306 and 308 of the application startup process 300 illustrated in FIG. 3 or blocks 408-416 of the application startup process 400 illustrated in FIG. 4.

The cache pre-load process 500 can select 502 a peer application. The peer application is one of the running applications associated with the set of running applications as discussed above in FIGS. 3 and 4. In one embodiment, the selection 502 of the peer application can be based on a score. After the peer application has been selected 502, a first individual cache can be selected 504. Next, cache data can be requested 506 from the peer application. The requested cache data is for use with the selected individual cache.

After the cache data is requested 506, a decision 508 can then determine whether the requested cache data has been received. When the decision 508 determines that the requested cache data has not yet been received, a decision 510 can determine whether the request for cache data has failed. When the decision 510 determines that the request for the cache data has not failed, the cache pre-load process 500 can return to repeat the decision 508. Alternatively, when the decision 510 determines that the request for cache data has failed, another peer application can be selected 512 and then the cache pre-load process 500 can return to repeat the block 504 and subsequent blocks to attempt to retrieve cache data from the newly selected peer application.

Once the decision 508 determines that the requested cache data has been received, the received cache data can be stored 514 to the selected individual cache. Here, the selected individual cache is loaded with cache data from the selected peer application. Here, the loading is typically a pre-loading of a cache for an application that is be started (or re-started). After the received cache data has been stored 514, a decision 516 determines whether there are any more individual caches is to be processed (i.e., pre-loaded). When the decision 516 determines that there are more individual caches to be processed, the cache pre-load process 500 can return to repeat the block 504 and subsequent blocks so that a next individual cache can be selected 504 and similarly processed. When the decision 516 determines that there are no more individual caches to be processed, the cache pre-load process 500 can end.

The various aspects, embodiments, implementations or features of the invention can be used separately or in any combination.

Media assets can pertain to audio (e.g., songs, audio books, podcasts), videos (e.g., movies, music videos) or images (e.g., photos), as different types of media assets. Media assets also include any combinations of these different type of media assets with other data.

The invention can be implemented by software, hardware, or a combination of hardware and software. The invention can also be embodied as computer readable code on a computer readable medium. The computer readable medium is any data storage device that can store data which can thereafter be read by a computer system. Examples of the computer readable medium generally include read-only memory and random-access memory. More specific examples of computer readable medium are tangible and include Flash memory, EEPROM memory, memory card, CD-ROM, DVD, hard drive, magnetic tape, and optical data storage device. The computer readable medium can also be distributed over network-coupled computer systems so that the computer readable code is stored and executed in a distributed fashion.

The advantages of the invention are numerous. Different embodiments or implementations may, but need not, yield one or more of the following advantages. One advantage of certain embodiments of the invention is that applications can use a cache memory to rapidly respond to data requests immediately upon being started. Another advantage of certain embodiments of the invention is that cache data for one application can be acquired from a cache another like (or peer) application.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method for operating a server application instance on a server computer in a data center environment while utilizing a server application cache for storing cached data, said method comprising:
  initiating startup of a server application instance;
  locating a set of running server application instances that are running in the data center environment and which correspond to the server application instance being started, the set of running server application instances being configured to distribute a load of network requests amongst the running server application instances that are running in the data center environment, with each of the running server application instances having a respective server application cache for storing its associated cached data;

scoring a plurality of the server application caches based at least in part upon usefulness of associated cached data stored therein to the server application instance being started, so as to obtain a plurality of server application cache scores;

selecting based at least in part upon the plurality of server application cache scores a server application cache corresponding to one of the running server application instances from the set of running server application instances;

retrieving cached data associated with the selected server application cache corresponding to the one of the running server application instances; and storing the retrieved cached data in a server application cache for the server application instance being started.

2. A method as recited in claim 1, wherein said retrieving of the cached data is performed over a network blackplane that connects those of the running server application instances in the set together.

3. A method as recited in claim 2, wherein the server application instances and the network backplane are all provided within a single data center.

4. A method as recited in claim 1, wherein the set of running server application instances all pertain to a particular application.

5. A method as recited in claim 1, wherein the cached data comprises a plurality of separate cache data, and wherein said retrieving and said storing can be repeated for each of the separate cache data.

6. A method as recited in claim 1, wherein said selecting of the server application cache corresponding to the running server application instance is based at least in part on number of entries of the associated cached data in the server application cache.

7. A method as recited in claim 1, wherein said selecting of the server application cache corresponding to the running server application instance is based at least in part upon proximity of the server application cache corresponding to the running server application instance to the server application cache for the server application instance being started.

8. A method for starting up an application operating on a computing device and utilizing cache storage for storing cached data, said method comprising:

initiating startup of the application;

locating a set of running applications that are peers with the application being started, with each of the running applications having associated cached data;

obtaining a set of scores pertaining to cached data associated with each of the running applications within the set of running applications;

selecting one of the scores;

requesting cached data from the running application corresponding to the selected score;

receiving cached data from the running application corresponding to the selected score; and storing the received cached data in cache storage for the application being started, wherein the scores for the cached data associated with each of the running applications are dependent on a number of entries of the associated cached data in the cache storage corresponding thereto.

9. A method as recited in claim 8, wherein said selecting selects the one of the scores that is the largest.

10. A method as recited in claim 8, wherein the scores for the cached data associated with each of the running applications include a randomized component.

11. A method as recited in claim 8, wherein the scores for the cached data associated with each of the running applications are dependent on proximity to the application being started.

12. A method as recited in claim 8, wherein said locating of the set of running applications that are peers with the application being started comprises:

sending a peer request over a network for the application being started requesting feedback from like applications present on the network;

receiving availability information pertaining to a plurality of like applications; and determining the set of running application that are peers with the application being started based on the received availability information.

13. A method as recited in claim 8, wherein the cached data pertains to a plurality of individual data caches.

14. A computer readable medium including at least executable computer program code tangibly stored thereon for improving response latency of a server application instance operating on a server computer in a data center environment, said computer readable medium comprising:

computer program code for identifying a server application instance having an associated server application cache to be updated;

computer program code for locating a set of running server application instances that are running in the data center environment and which correspond to the identified server application instance, the set of running server application instances being configured to distribute a load of network requests amongst the running server application instances in the data center environment, with each of the running server application instances having respective cached data stored in an associated respective server application cache;

computer program code for obtaining a plurality of scores, each of the scores corresponding to one of the running server application instances in the set of running server application instances, and each score being reflective of cached data at the corresponding server application cache;

computer program code for selecting a server application cache corresponding to one of the running server application instances from the set of running server application instances based at least in part upon the plurality of server application cache scores;

computer program code for retrieving cached data associated with the selected server application cache of the running server application instance; and computer program code for storing the retrieved cached data in the associated server application cache to be updated.

15. A computer readable medium as recited in claim 14, wherein the identified server application instance is being started, and the retrieved cached data is being stored to the associated server application cache corresponding to the identified server application instance.

16. A computer readable medium as recited in claim 14, wherein said computer program code for selecting a server application cache corresponding to one of the running server application instances is based at least in part on status of cached data at the application server caches for each of the running server application instances in the set of running server application instances.

17. A method for operating a server application instance on a server computer in a data center environment while utilizing a server application cache of the server application instance for storing cached data, said method comprising:

initiating startup of the server application instance;

locating a set of server application instances running on the server computer associated with the server application instance being started, wherein a load of network requests are able to be distributed amongst the server application instances running in the data center environment, with each of the server application instances having a respective server application cache for storing its associated cached data;

selecting a server application cache corresponding to one of the server applications instances from the set of server applications instances; and copying cached data associated with the selected server application cache to the server application cache corresponding to the server application instance being started, wherein said selecting of the server application cache corresponding to the one of the server application instance comprises:

obtaining a plurality of scores, each of the scores corresponding to one of the server applications instances in the set of server application instances, and each score being reflective of cached data at the server application cache corresponding to each of the server application instances; and selecting the server application cache corresponding to the server application instance from the set of running server applications instances based at least in part on the score.

* * * * *

UNITED STATES PATENT AND TRADEMARK OFFICE
CERTIFICATE OF CORRECTION

PATENT NO. : 8,261,026 B2
APPLICATION NO. : 12/044852
DATED : September 4, 2012
INVENTOR(S) : Ryan R. Klems et al.

It is certified that error appears in the above-identified patent and that said Letters Patent is hereby corrected as shown below:

Column 9, Line 21 at Claim 2; replace:
"the cached data is performed over a network blackplane that" with
-- the cached data is performed over a network backplane that --

Signed and Sealed this
Second Day of April, 2013

Teresa Stanek Rea
*Acting Director of the United States Patent and Trademark Office*